April 6, 1954 R. R. SUTTON 2,674,292
AUTOMOBILE TIRE
Filed Nov. 19, 1951

INVENTOR.
Roy R. Sutton
BY
ATTORNEY.

Patented Apr. 6, 1954

2,674,292

UNITED STATES PATENT OFFICE 2,674,292

AUTOMOBILE TIRE

Roy R. Sutton, Winfield, Kans.

Application November 19, 1951, Serial No. 257,023

1 Claim. (Cl. 152—342)

This invention relates to tires particularly adapted for use on automobiles, the primary object being to improve upon the invention disclosed in my U. S. Letters Patent No. 2,530,213, dated November 14, 1950.

It is the most important object of the present invention to provide a tire of the kind disclosed in said patent but having the advantage thereover of being completely balanced, both dynamically and statically.

An important object hereof is to provide a tire of the aforementioned character that may be used with or without a tube as desired, and thereby improving upon the disclosure of my patent wherein a tubeless tire only was contemplated.

A still further object of this invention is to provide a tire having closure means adjacent the rim of the wheel upon which the same is mounted, including a pair of spaced, identical, annular reinforcements, together with a spanning member releasably interconnecting such reinforcements and bearing against the said rim of the wheel.

A still further object hereof is to provide dual reinforcing annuli as aforesaid that are adapted additionally to support a tube within the casing if desired.

Additional, more minor objects will be made clear or become apparent as the following specification progresses, reference being had to the accompanying drawing, wherein.

Figure 1:
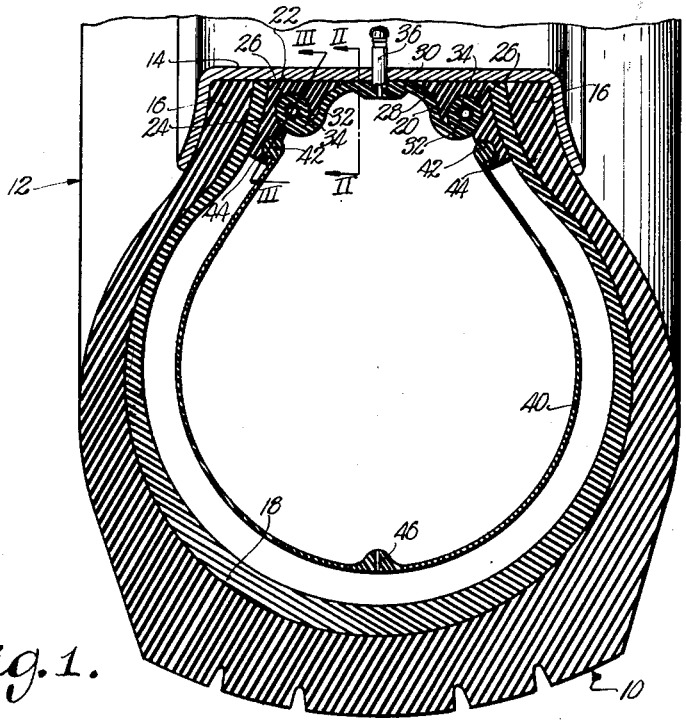
Figure 1 is a cross-sectional view through a tire made according to the present invention showing the same mounted on a wheel.
Figure 2:
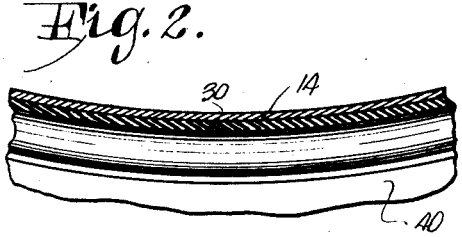
Fig. 2 is a fragmentary, detailed, cross-sectional view taken on line II—II of Fig. 1.
Figure 3:
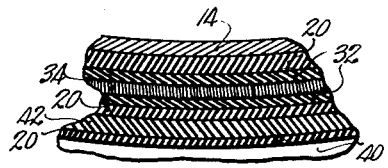
Fig. 3 is a fragmentary, detailed, cross-sectional view taken on line III—III of Fig. 1.

The new and improved automobile tire forming the subject matter of the present invention includes a casing broadly designated by the numeral 10 adapted for mounting upon a wheel 12 in complete surrounding relationship to a rim 14 forming a part of the wheel 12.

The casing 10 is substantially of conventional character so far as its cross-sectional configuration is concerned, and therefore, includes a pair of spaced, rim-engaging, enlarged clinchers 16. Pursuant to my invention hereof, the inner walls of the casing 10 are completely coated with a lining 18 of butyl rubber or the like to render the same air-tight and prevent loss of air from the casing 10 through the pores thereof.

A pair of annular, rubber or rubber-like reinforcements 20 of identical character, completely surround the rim 14 and are disposed in spaced-apart relationship as shown in Fig. 1 of the drawing. Each reinforcement 20 is substantially triangular in cross-section, presenting a pair of annular walls 22 and 24 bearing tightly against the rim 14 and the lining 18 respectively. It is to be preferred that the reinforcements 20 be permanently secured to the casing 10 and particularly to the lining 18 by use of a suitable adhesive between walls 24 and the proximal inner faces of lining 18. Each reinforcement 20 is provided with an annular, transversely arcuate groove 26 within the third face 28 thereof, and substantially midway between the rim 14 and the opposite ends of the reinforcements 20.

An annular rubber or rubber-like flexible bridging member 30, completely surrounds the rim 14 between the reinforcements 20—20 in engagement with rim 14 and is connected to both of the reinforcements 20 through the medium of an annular, substantially circular bead 32 within each groove 26 respectively. Thus, there is a bead 32 along each annular, marginal edge respectively of the bridging member 30 and each bead 32 is substantially complemental in cross-sectional configuration with its groove 26. It is of course, preferred that the diameters of the beads 32 be initially greater than the inside diameters of the grooves 26 to the end that when the beads are moved into the grooves, they will connect with the reinforcements 20 by a snap action.

It is notable in Figure 1 of the drawing, that the bridging member 30 overlaps and engages a portion of the surfaces 28 of the reinforcements 20 between the grooves 26 and the rim 14. As in my patent aforementioned, the beads 32 each has an annular coil spring 34 embedded therein to additionally serve as a means to releasably hold the beads 32 within their grooves 26 by the snap action aforesaid.

Figure 4:
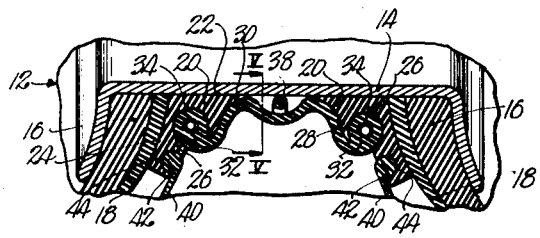
Fig. 4 is a fragmentary, detailed, cross-sectional view similar to Fig. 1, but showing one of the handles of the spanning member.
Figure 5:
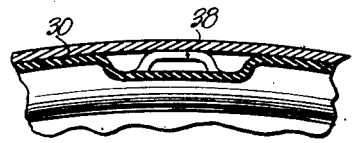
Fig. 5 is a fragmentary, detailed, cross-sectional view taken on line V—V of Fig. 4.

Air is admitted or exhausted by means of a valve stem 36 having a self-contained valve of any conventional character not shown, and extending through the rim 14. Valve stem 36 is permanently affixed to the bridging member 30 through which it passes. Means for facilitating the removal of the bridging member 30 from the reinforcements 20 includes a plurality of handles 38 suitably affixed to the bridging member 30 and interposed between the latter and the proximal face of rim 14, as shown in Figs. 4 and 5 of the drawing.

The reinforcements 20 are additionally adapted to receive an inner tube 40 and to hold the same in suspension within the casing 10 in spaced-relationship to the lining 18 in the manner illustrated by Fig. 1 of the drawing. The inner tube 40 is provided with a pair of annular, substantially circular beads 42, fittable by snap action within correspondingly shaped annular grooves 44 formed in the reinforcements 20 also in surfaces 28 thereof. The inner tube 40 is provided with one or more air passage ducts 46 in opposed relationship to the rim 14.

In the event that the casing 10 is punctured or otherwise damaged, air will evacuate from the casing 10 exteriorly of the tube 40 and the latter will support the automobile until the same can come to a stop because of the slow egress of air from the tube 40 through duct or ducts 46.

Having thus described the invention what is claimed as new and desired to be secured by Letters Patent is:

A tire comprising a casing having an inner lining and a pair of spaced, annular, rim-engaging portions; an annular reinforcement in the casing for each of said rim-engaging portions respectively, said reinforcements being initially separate from the casing, each reinforcement being substantially triangular-shaped in cross-section and having a first surface engaging the rim, a second surface engaging said lining and spaced from said rim-engaging portions, and a third surface provided with an annular groove; a flexible, annular bridging member engageable with the rim between said reinforcements, said bridging member having an annular, marginal bead fitted into each groove respectively, whereby said reinforcements and said bridging member present an air seal between said rim-engaging portions, the beads of said bridging member being in snap-fit engagement with said grooves, said reinforcements each having a second annular groove in said third surface between said bridging member and said second surface; an inner tube within said casing, said inner tube having an annular, marginal bead fitted into each of said second grooves respectively, all of said beads having a diameter greater than the width of the corresponding grooves whereby said beads are releasably locked within said grooves; an outwardly extending valve stem in said bridging member; and a plurality of spaced handles attached to said bridging member exteriorly of the casing between said reinforcements for removing the beads of said bridging member from their respective grooves.

References Cited in the file of this patent

UNITED STATES PATENTS

| Number | Name | Date |
| --- | --- | --- |
| 559,873 | Sweetland | May 12, 1896 |
| 2,200,916 | Crowley | May 14, 1940 |
| 2,530,213 | Sutton | Nov. 14, 1950 |
| 2,541,550 | Sarbach et al. | Feb. 13, 1951 |

FOREIGN PATENTS

| Number | Country | Date |
| --- | --- | --- |
| 10,272 | Great Britain | 1898 |

OTHER REFERENCES

Tires Service Station for February 1951, vol. XXXII, No. 7, page 36 cited. (Copy in Library and Div. 45.)